United States Patent
Yasuda

(10) Patent No.: US 7,113,350 B2
(45) Date of Patent: Sep. 26, 2006

(54) LENS BARREL AND OPTICAL DEVICE

(75) Inventor: Toshiyuki Yasuda, Kawasaki (JP)

(73) Assignee: Yasuda, Toshiyuki, Tokyo (JP)

( * ) Notice: Subject to any disclaimer, the term of this patent is extended or adjusted under 35 U.S.C. 154(b) by 37 days.

(21) Appl. No.: 11/313,455

(22) Filed: Dec. 21, 2005

(65) Prior Publication Data

US 2006/0139777 A1 Jun. 29, 2006

(30) Foreign Application Priority Data

Dec. 24, 2004 (JP) .............................. 2004-373421

(51) Int. Cl.
*G02B 7/02* (2006.01)

(52) U.S. Cl. ...................... 359/819; 359/821; 359/822; 359/811

(58) Field of Classification Search ................ 359/811, 359/813, 814, 819, 821, 822, 823, 824, 825, 359/826

See application file for complete search history.

(56) References Cited

FOREIGN PATENT DOCUMENTS

JP 2004-85932 A 3/2004

*Primary Examiner*—Timothy Thompson
(74) *Attorney, Agent, or Firm*—Rossi, Kimms & McDowell LLP.

(57) ABSTRACT

A lens barrel and an optical device that can be reduced in size while maintaining high optical performance. A lens barrel has a cam ring (3) that is disposed for rotation about an optical axis. A linked member (37) can advance and recede in a direction of the optical axis with rotation of the cam ring about the optical axis. First and second cam grooves (3d, 3e) is formed in the cam ring for guiding advancement and receding of the linked member in the direction of the optical axis. First and second cam-followers (8a, 8b) are provided in the linked member and are engageable with the first cam groove and the second cam groove, respectively. The second cam-follower is disengageable from its corresponding second cam groove. A depth of the second cam groove in a position where the second cam-follower is introduced into the second cam groove is deeper that of the second cam groove at a different position.

7 Claims, 10 Drawing Sheets

A-A

LENS BARREL AND OPTICAL DEVICE

BACKGROUND OF THE INVENTION

1. Field of the Invention

The present invention relates to a lens barrel in which a lens holder advances and recedes in a direction of an optical axis with rotation of a cam ring about the optical axis, and an optical device incorporating the lens barrel.

2. Description of the Related Art

Conventionally, there have been known lens barrels for cameras that carry out zooming and focusing operations by performing lens movement in a direction of an optical axis by driving a cam. Further, another type of lens barrel has been proposed which is provided with a first cam-follower engageable with a first cam groove formed in a cam ring and a second cam-follower engageable with and disengageable from a second cam groove formed in the cam ring, to thereby shorten the length of the cam ring in the optical axis direction without shortening the maximum possible moving distance of the lens barrel (for example, refer to Japanese Laid-Open Patent Publication (Kokai) No. 2004-085932). The lens barrel of this kind is arranged such that corresponding ones of the cam-followers and the cam grooves have some degree of allowance (play) during engagement, so that the lens movement is carried out smoothly in particular when the second cam-follower is brought into or out of engagement with the second cam groove. Due to this allowance, there is a possibility that the optical axis of the lens barrel provided with the cam-followers and that of the cam ring formed with cam grooves may become misaligned, that is, an offset may occur.

Now, a construction as shown in FIG. 10 is referred to by way of example, in which a second-group lens barrel 37 advances and recedes in an optical axis direction according to a pivotal movement of a moving cam ring 3. In this construction, first and second cam grooves 3d and 3e are formed at different positions in the moving cam ring 3 as viewed in the optical direction and have the same basic groove shape, so that the cam grooves extend in parallel to each other and describe the same locus. However, the second cam groove 3e is comprised of an actual cam groove portion extending to a rear end of the moving cam ring 3, and a virtual cam groove portion which is a virtual extension of the actual cam groove portion. That is, the virtual cam groove portion of the cam groove 3e is hypothetically provided at a position outside the moving cam ring 3 where any cam groove cannot actually be formed. Two fixed followers 37a and 37b having tapered front end portions are provided on the outer peripheral portion of the second-group lens barrel 37. When the second-group lens barrel 37 moves in the optical axis direction and reaches a predetermined position, the fixed follower 37b of the second-group lens barrel 37 disengages from the actual cam groove portion of the cam groove 3e and advances to a virtual cam groove portion thereof, or reversely, advances to the actual cam groove portion from the virtual cam groove portion. The other fixed follower portion 37a remains engaged with the first cam groove 3d irrespective of the moving position of the second-group lens barrel 37.

However, since there is allowance between each of the fixed followers 37a and 37b and a corresponding one of the cam grooves 3d and 3e, the second-group lens barrel 37 may offset from the moving cam ring 3, and thus, there is a possibility that a predetermined optical performance cannot be maintained.

With a lens barrel having the above mechanism, in order to not cause negative effects on optical performance, it is necessary to provide an optical design such that the sensitivity to the degree of parallelism between the lens groups becomes small. However, to realize such an optical design, the number of lenses in the construction increases which causes the total length of the lens barrel to become longer and the size of the lens barrel to become larger. This is disadvantageous in terms of the recent demands for low cost, smaller size and lighter weight.

Therefore, in order to shorten the total length of the lens barrel, a solution may be to reduce the number of lenses. This requires an optical design that realizes the lens groups to be highly coaxial with each other, which makes it necessary to design a lens barrel that reduces the allowance between the cam groove and the cam-follower during engagement. However, if the allowance between the cam groove and the cam-follower during engagement is reduced, there is a possibility that the cam-follower will hook on to the cam groove when it disengages from the cam groove or remounts onto the cam groove. In such a case, the base board of the camera body will vibrate microscopically, and such vibration will transfer to the image forming plane. Due to this, when using an electronic viewfinder in an electronic still camera, the photographic screen will shake and cause a so-called image shaking. In a worst-case scenario, the cam-follower will remain hooked to the cam groove, and consequently, the lens barrel may not operate. Reducing the allowance between the cam groove and the cam-follower during engagement imposes restrictions on obtaining high optical performance.

SUMMARY OF THE INVENTION

It is an object of the present invention to provide a lens barrel and an optical device that can be reduced in size while maintaining high optical performance.

To attain the above object, in a first aspect of the present invention, there is provided a lens barrel comprising a cam ring that is disposed for rotation about an optical axis, a linked member that can advance and recede in a direction of the optical axis with rotation of the cam ring about the optical axis, first and second cam grooves formed in the cam ring for guiding advancement and receding of the linked member in the direction of the optical axis, and first and second cam-followers (8a, 8b) that are provided in the linked member and are engageable with the first cam groove and the second cam groove, respectively, wherein the second cam-follower is disengageable from its corresponding second cam groove, a depth of the second cam groove in a position where the second cam-follower is introduced into the second cam groove is deeper than that of the second cam groove at a different position.

To attain the above object, in a second aspect of the present invention, there is provided a lens barrel comprising a cam ring that is disposed for rotation about an optical axis, a linked member that can advance and recede in a direction of the optical axis with rotation of the cam ring about the optical axis, first and second cam grooves formed in the cam ring for guiding advancement and receding of the linked member in the direction of the optical axis, first and second cam-followers that are provided in the linked member and are engageable with the first cam groove and the second cam groove, respectively, and an urging member that urges the first and second cam-followers, wherein at least one of the first and second cam-followers is disengageable from its corresponding cam groove.

Preferably, a depth of the second cam groove in a position where the second cam-follower is introduced into the second cam groove is deeper than that of the second cam groove at a different position.

Preferably, a front end portion of at least one of the first and second cam-followers is tapered.

Preferably, a front end portion of at least one of the first and second cam-followers is spherical.

To attain the above object, in a third aspect of the present invention, there is provided an optical device including a lens barrel comprising a cam ring that is disposed for rotation about an optical axis, a linked member that can advance and recede in a direction of the optical axis with rotation of the cam ring about the optical axis, first and second cam grooves formed in the cam ring for guiding advancement and receding of the linked member in the direction of the optical axis, and first and second cam-followers that are provided in the linked member and are engageable with the first cam groove and the second cam groove, respectively, wherein the second cam-follower is disengageable from its corresponding second cam groove, a depth of the second cam groove in a position where the second cam-follower is introduced into the second cam groove is deeper than that of the second cam groove at a different position.

To attain the above object, in a fourth aspect of the present invention, there is provided an optical device including a lens barrel comprising a cam ring that is disposed for rotation about an optical axis, a linked member that can advance and recede in a direction of the optical axis with rotation of the cam ring about the optical axis, first and second cam grooves formed in the cam ring for guiding advancement and receding of the linked member in the direction of the optical axis, first and second cam-followers that are provided in the linked member and are engageable with the first cam groove and the second cam groove, respectively, and an urging member that urges the first and second cam-followers, wherein at least one of the first and second cam-followers is disengageable from its corresponding cam groove.

According to the present invention, it is possible to reduce the size of the lens barrel while maintaining high optical performance.

The above and other objects, features, and advantages of the present invention will become more apparent from the following detailed description taken in conjunction with the accompanying drawings.

DETAILED DESCRIPTION OF THE PREFERRED EMBODIMENTS

The present invention will now be described in detail below with reference to the drawings showing a preferred embodiment thereof.

Figure 1:
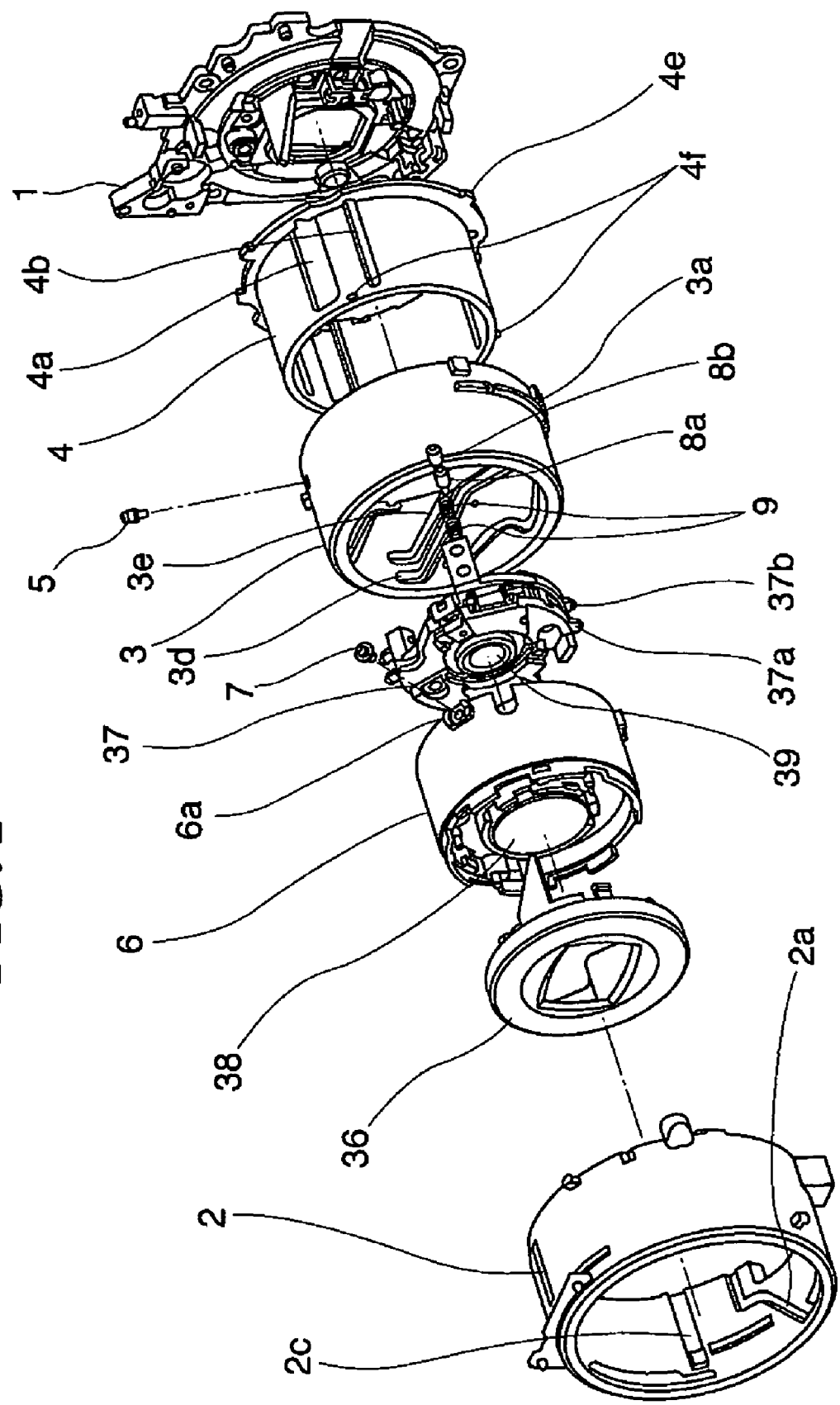
FIG. 1 is an exploded perspective view showing the construction of a lens barrel according to a first embodiment of the present invention.
Figure 2A:
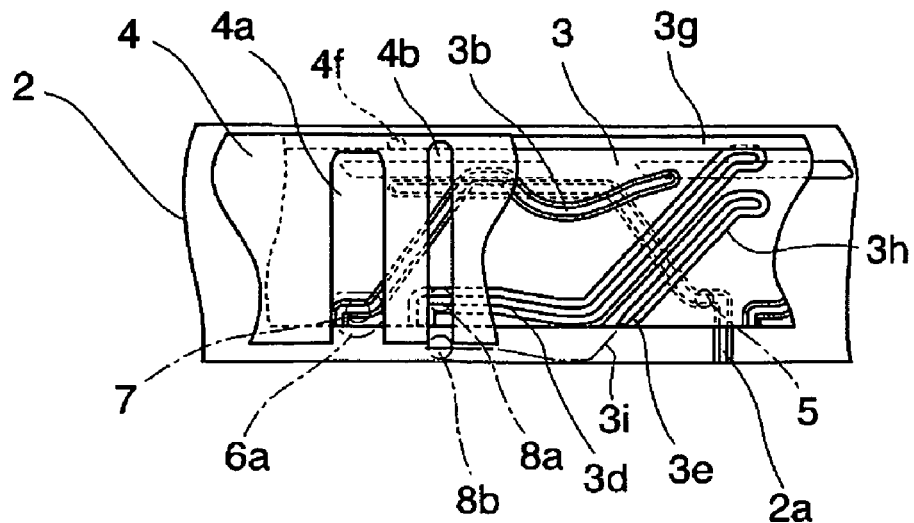
FIG. 2A is a circumferentially developed view showing the construction of a cam of the lens barrel in FIG. 1 in a retracted position.
Figure 2B:
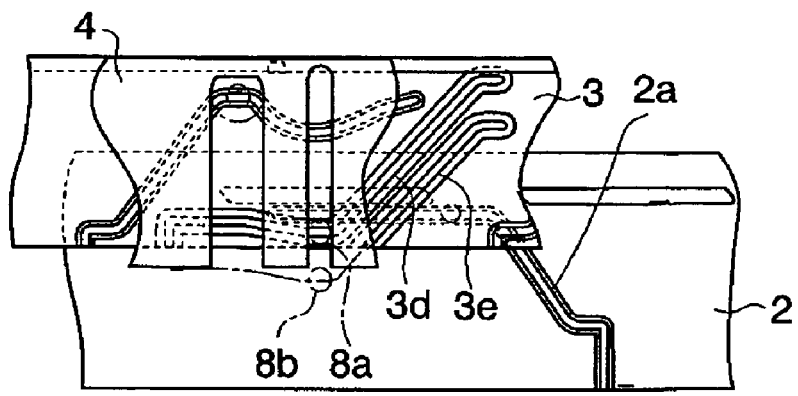
FIG. 2B is a circumferentially developed view showing the construction of the cam of the lens barrel in FIG. 1 at the time of a wide-angle shot.
Figure 2C:
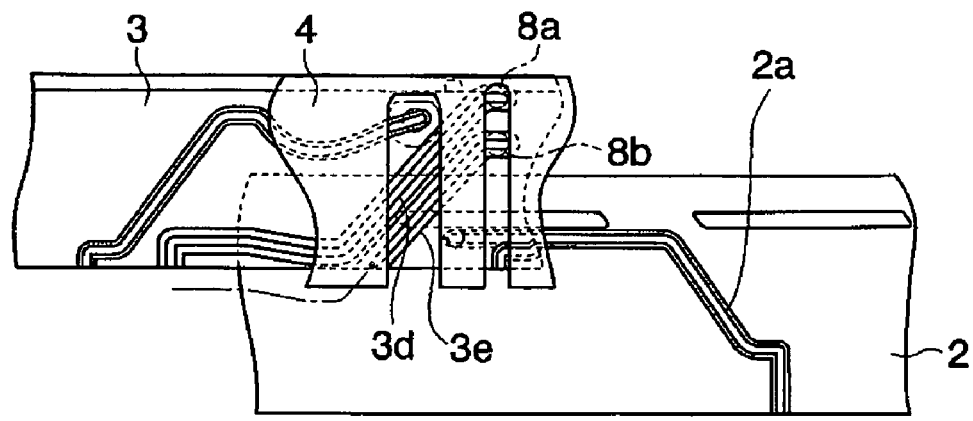
FIG. 2C is a circumferentially developed view showing the construction of the cam of the lens barrel in FIG. 1 at the time of a telephoto shot.
Figure 3A:
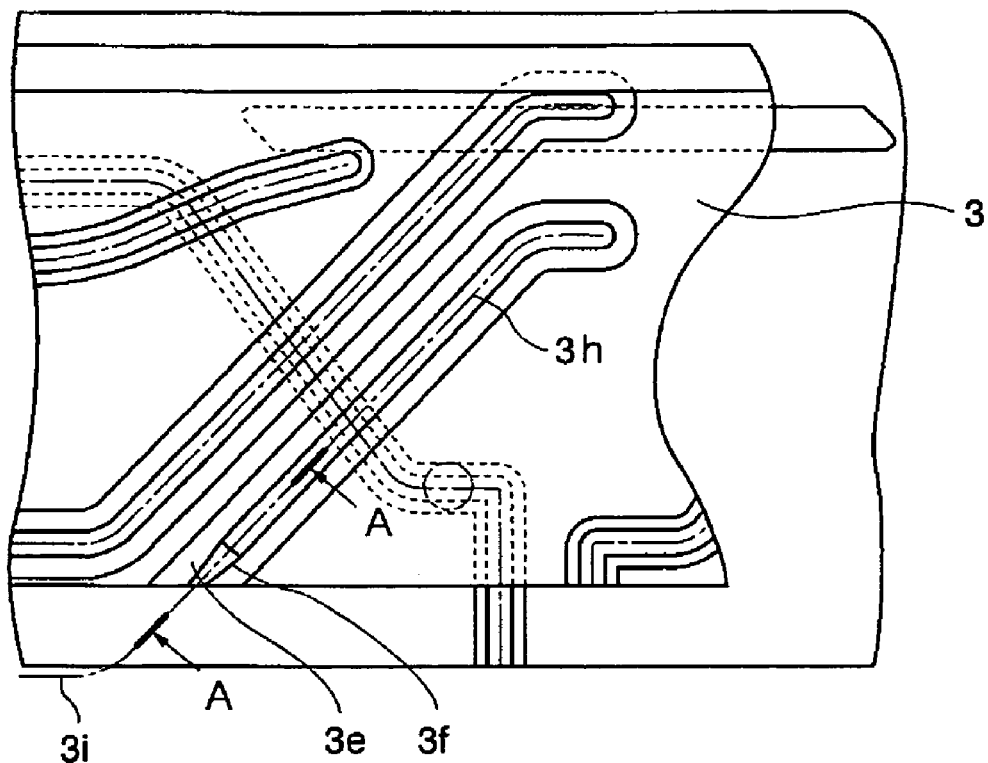
FIG. 3A shows a state immediately before a movable cam-follower switches to a cam groove of a moving cam ring.
Figure 3B:
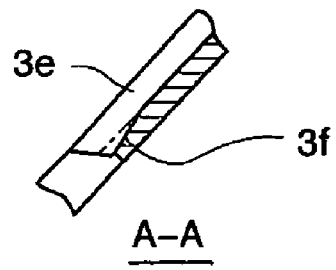
FIG. 3B is a cross-sectional view taken along a cross section A—A in FIG. 3A.
Figure 4A:
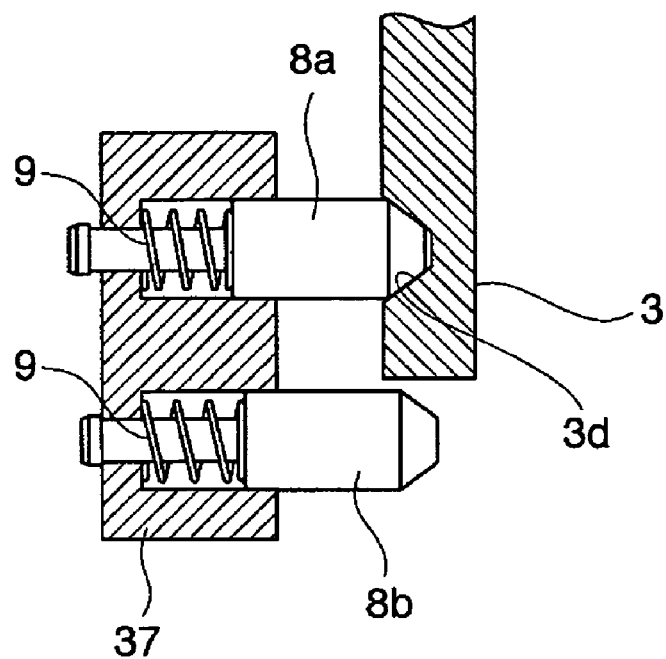
FIG. 4A is a cross-sectional view of a state where a movable cam-follower is engaged with a cam groove of the moving cam ring, and another movable cam-follower is disengaged from a corresponding cam groove of the moving cam ring.
Figure 4B:
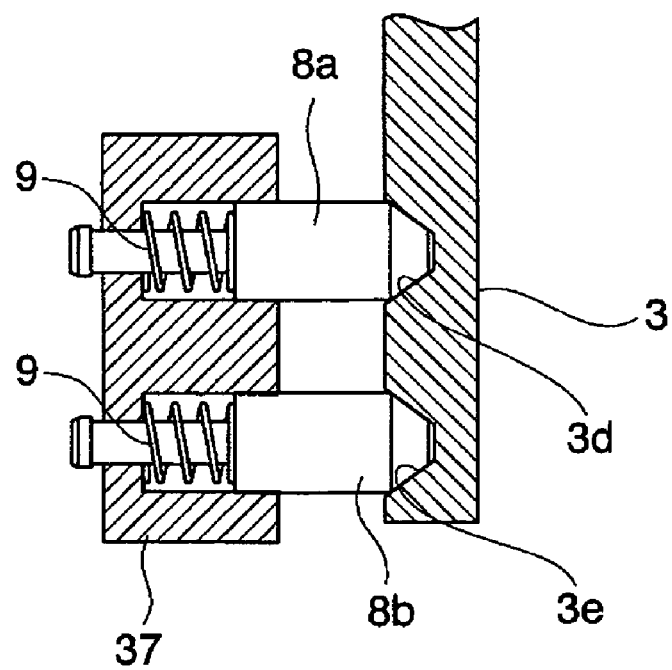
FIG. 4B is cross-sectional view of a state where the movable cam-followers are engaged respectively, to the cam grooves of the moving cam ring.
Figure 5:
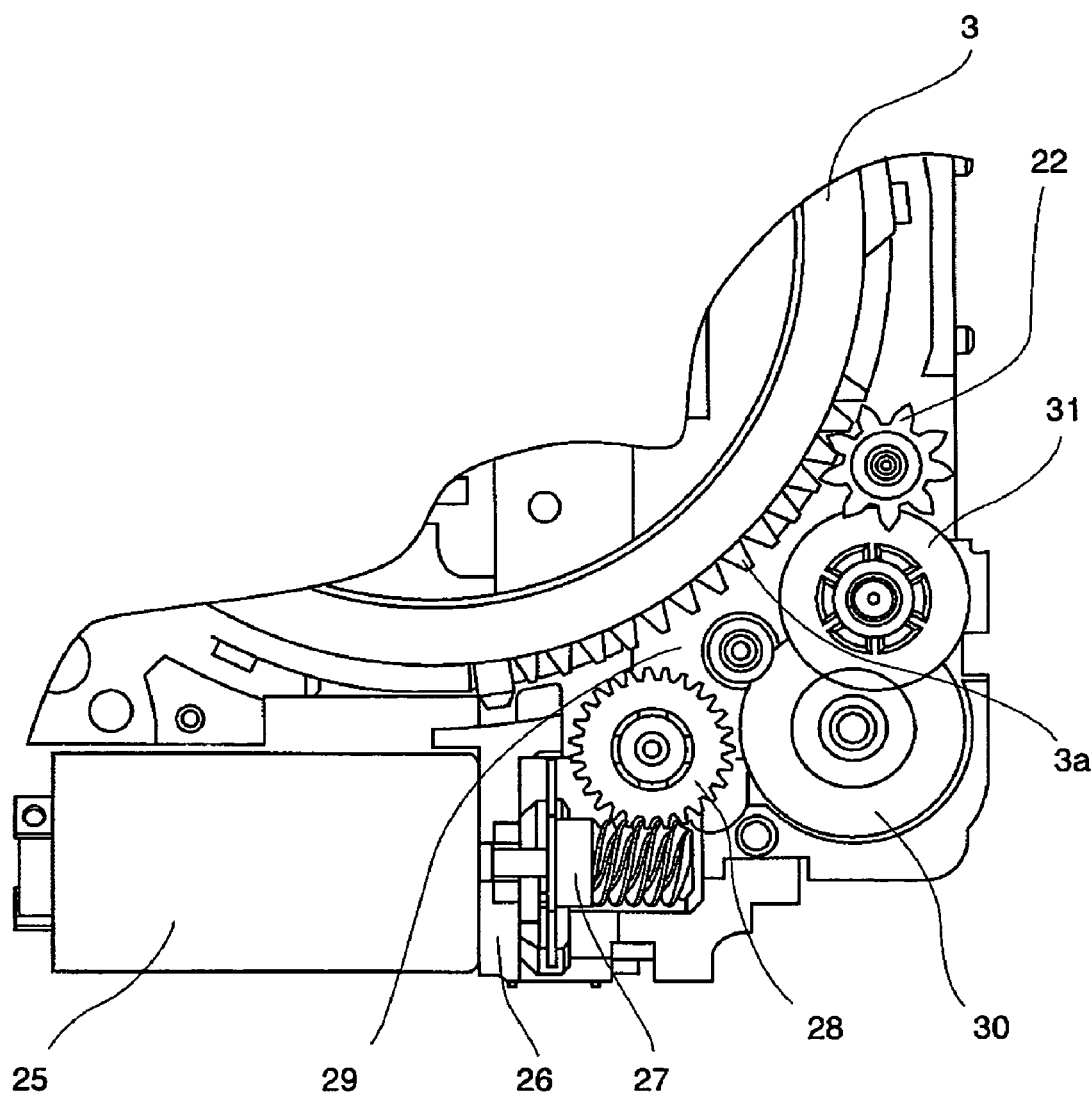
FIG. 5 is a view showing the moving cam ring of the lens barrel of FIG. 1 and a driving mechanism therefor.
Figure 6:
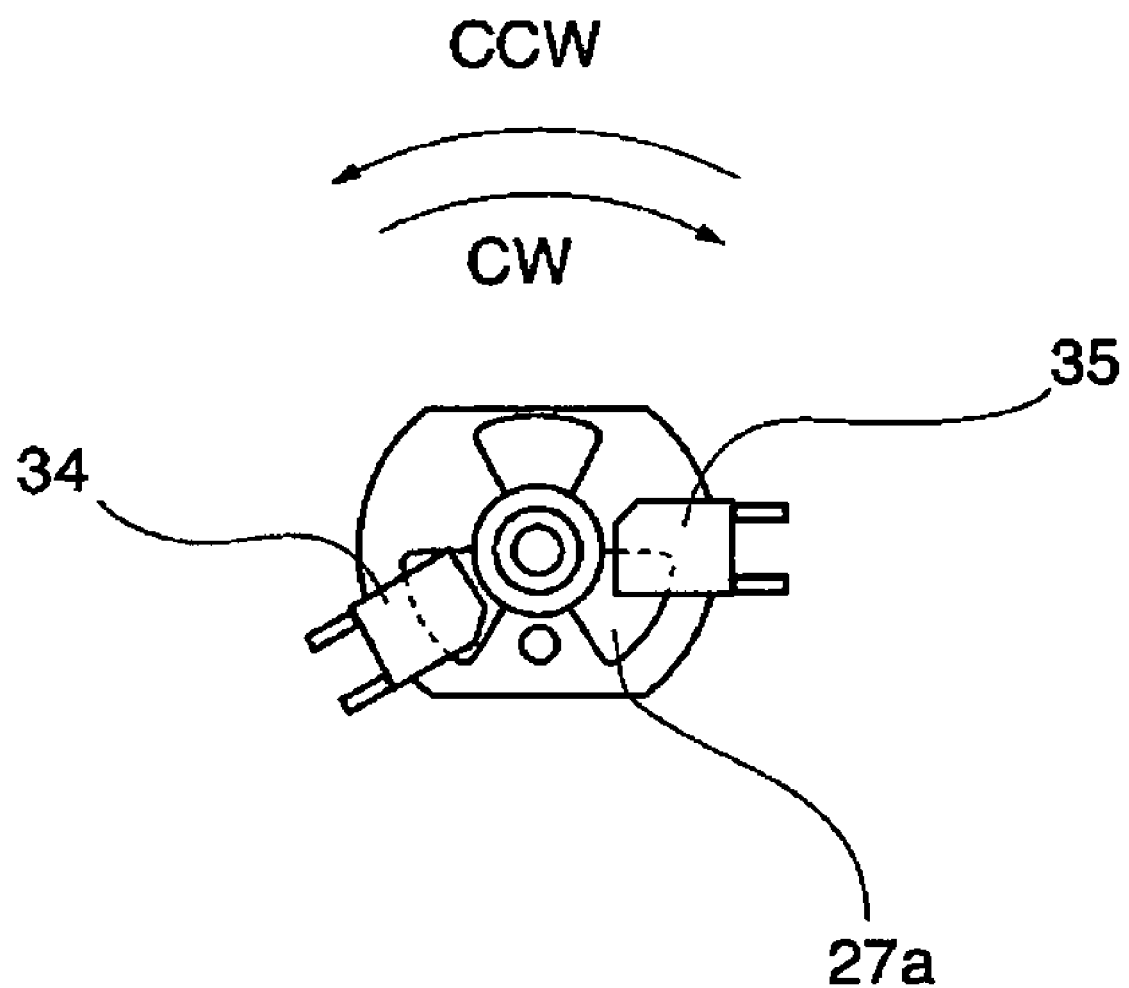
FIG. 6 is a view showing a mechanism for detecting the number and direction of rotations of a zoom motor provided in a worm gear appearing in FIG. 5.
Figure 7:
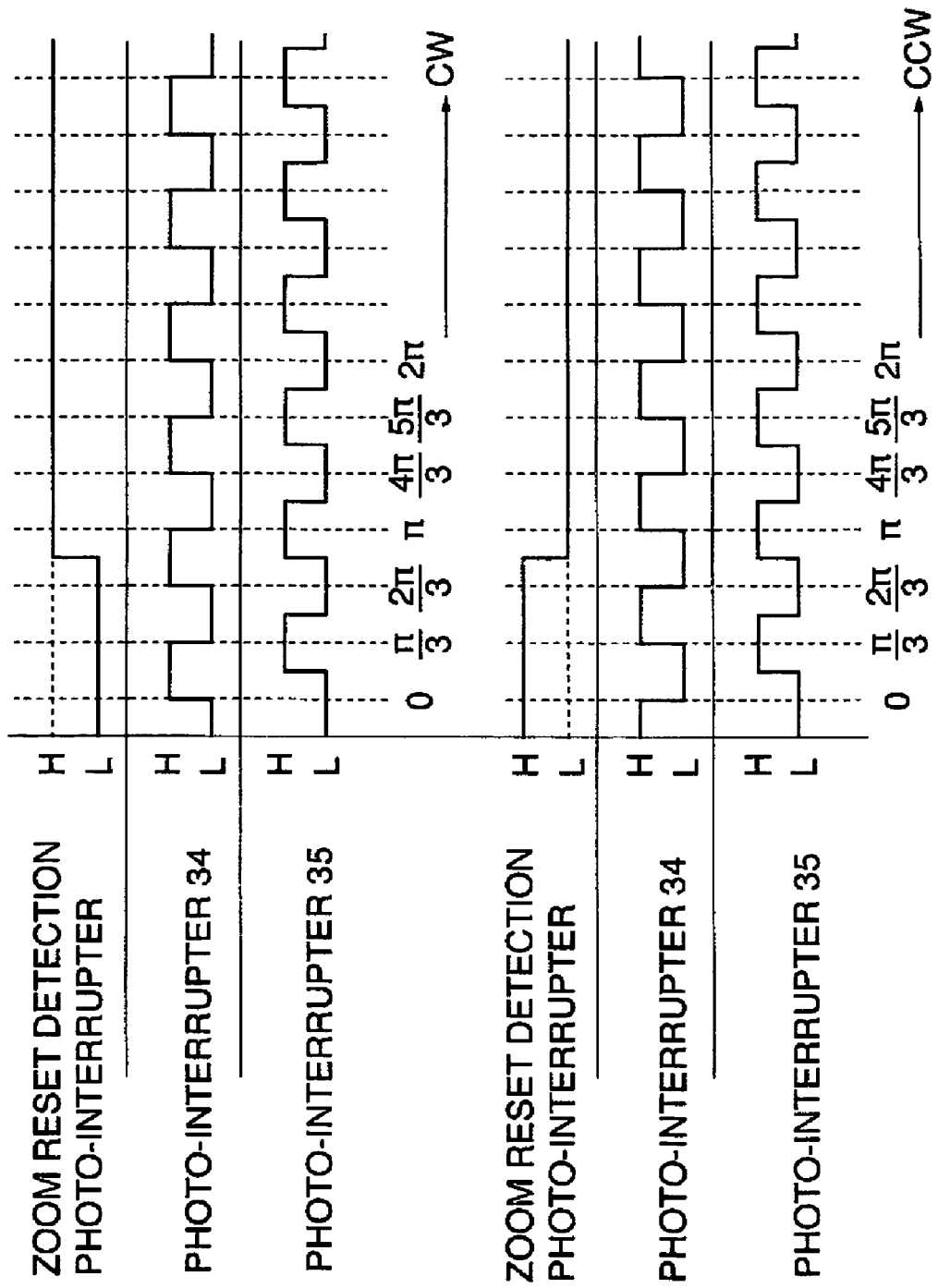
FIG. 7 is a view showing signal waveforms that are outputted from photo-interrupters appearing in FIG. 6.
Figure 8:
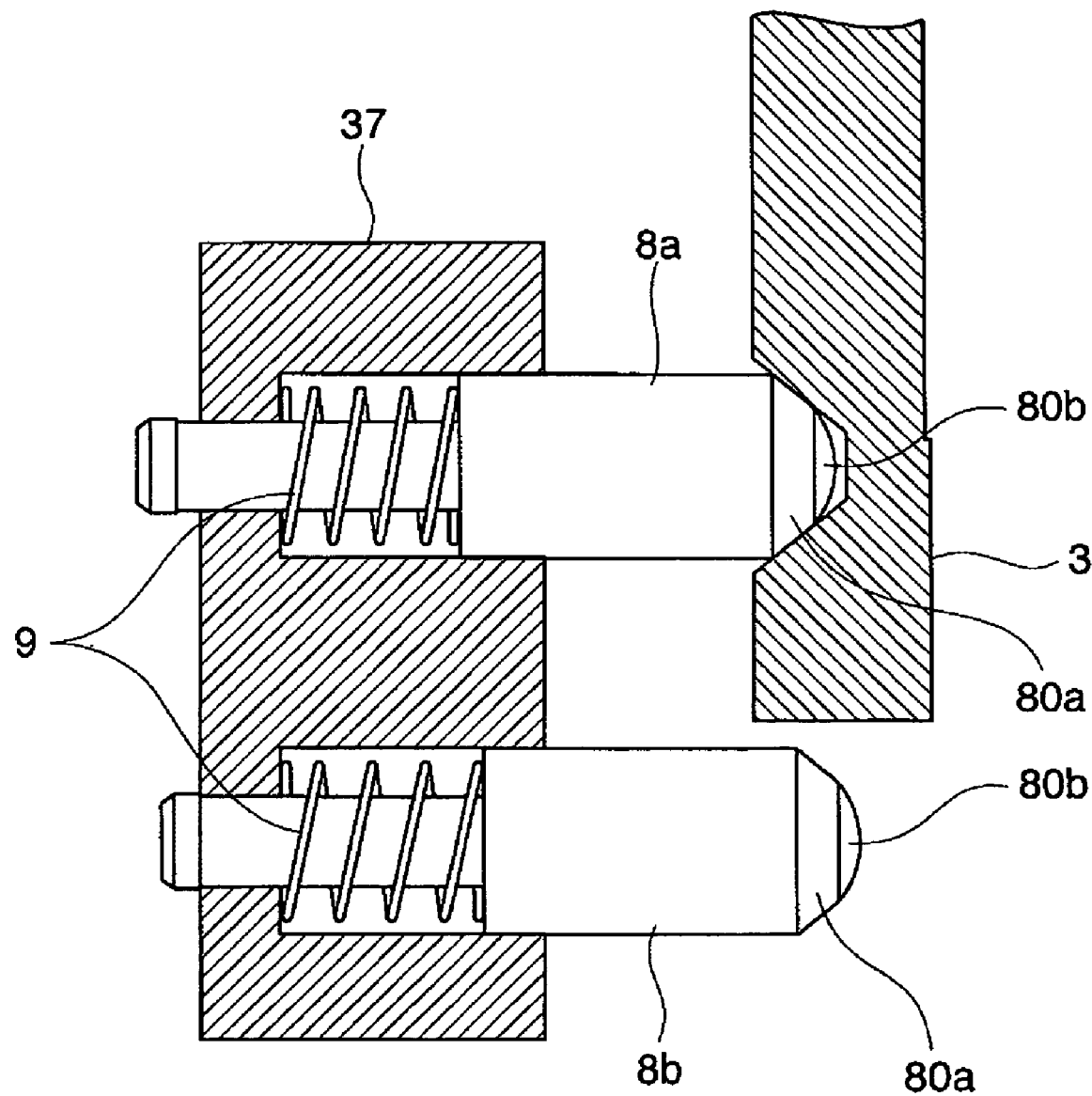
FIG. 8 is a cross-sectional view of a movable cam-follower that can replace the movable cam-follower appearing in FIG. 4.

FIG. 1 is an exploded perspective view showing the construction of a lens barrel according to a first embodiment of the present invention. FIG. 2A is a circumferentially developed view showing the construction of a cam of the lens barrel in FIG. 1 in a retracted position, FIG. 2B is a circumferentially developed view showing the construction of the cam of the lens barrel in FIG. 1 at the time of a wide-angle shot, and FIG. 2C is a circumferentially developed view showing the construction of the cam of the lens barrel in FIG. 1 at the time of a telephoto shot. FIG. 3A shows a state immediately before a movable cam-follower, acting as a cam-follower, switches to a cam groove of a moving cam ring, and FIG. 3B is a cross-sectional view taken along a cross section A—A in FIG. 3A. FIG. 4A is a cross-sectional view of a state where a movable cam-follower is engaged with a cam groove of the moving cam ring, and another movable cam-follower is disengaged from a corresponding cam groove of the moving cam ring, and FIG. 4B is cross-sectional view of a state where the movable cam-followers are engaged respectively, to the cam grooves of the moving cam ring. FIG. 5 is a view showing the moving cam ring of the lens barrel of FIG. 1 and a driving mechanism therefor. FIG. 6 is a view showing a mechanism for detecting the number and direction of rotations of a zoom motor provided in a worm gear appearing in FIG. 5. FIG 7 is a view showing signal waveforms that are outputted from photo-interrupters appearing in FIG. 6. FIG. 8 is a cross-sectional view of a movable cam-follower that can replace the movable cam-follower appearing in FIG. 4.

As shown in FIG. 1, the lens barrel has a base 1 that serves as the base section of the lens barrel, and a fixed barrel 2 that is rigidly screwed onto a front end portion of the base 1. The fixed barrel 2 accommodates therein a first-group lens barrel 6 and a second-group lens barrel 37. A cam groove 2a and a groove 2c are formed in the inner surface of the fixed barrel 2.

The first-group lens barrel 6 holds a first lens group 38. The first-group lens barrel 6 has an outer peripheral surface thereof to which three follower pins 7 disposed circumferentially at equal intervals and having tapered end portions are press-fitted. A barrier unit 36 is fixed to a front surface of the first-group lens barrel 6 to protect the front surface section of the first lens group 38 when a picture is not taken. The second-group lens barrel 37 holds a second lens group 39. Two fixed followers 37a and 37b having tapered end portions and two movable cam-followers 8a and 8b as cam-followers each urged by a compression spring 9 are arranged at equal intervals on an outer peripheral surface of the second-group lens barrel 37. The movable cam-followers 8a and 8b are tapered at their end portions. The second-group lens barrel 37 is provided with a mechanism (not shown) to drive a diaphragm blade (not shown) and a shutter blade.

As shown in FIG. 2A, a metal follower pin 5 that is press-fitted into a moving cam ring 3 engages with the cam groove 2a of the fixed barrel 2. Due to the follower pin 5 engaging with the cam groove 2a, the moving cam ring 3 moves in the direction of the optical axis while pivoting along the cam groove 2a. The moving cam ring 3 has an outer periphery thereof formed with gear teeth 3a. As shown in FIG. 5, a driving force of a zoom motor 25 is transmitted to the gear teeth 3a, via a gear 22 and gears 27 to 31, whereby the moving cam ring 3 is rotatively driven. Referring to FIG. 6, a worm gear 27 has three blades 27a mounted thereon for detecting the rotation of the zoom motor 25, and photo interrupters 34 and 35 are arranged in positions where the three blades 27a can block slits of the photo interrupters 34 and 35. The photo interrupters 34 and 35 output signals having signal waveforms as shown in FIG. 7. The direction (CCW and CW direction) and number of rotations of the zoom motor 25 are detected from the output signals of the photo interrupters 34 and 35, and control of focal length of the photographic optical system, control of the lens barrel movement, etc. are carried out based on these output signals.

A straight advance guide barrel 4 is rotatably fitted in the moving cam ring 3. The straight advance guide barrel 4 includes a projection 4e which is fitted in the groove 2c formed in the fixed barrel 2 such that the straight advance guide barrel 4 is prevented from rotating with respect to the fixed barrel 2. Further, the straight advance guide barrel 4 has three projections 4f formed on a front end section thereof. Each projection 4f is fitted in a groove 3g (FIG. 2A) that is formed in the inner surface of the moving cam ring 3. With this construction, the straight advance guide barrel 4 can rotate relative to the moving cam ring 3 while moving in unison with the moving cam ring 3 in the direction along the optical axis. As explained previously, the three follower pins 7 are provided in the first-group lens barrel 6. Each of the follower pins 7 made of metal engages with a cam groove 3b of the moving cam ring 3. On the other hand, a straight movement groove 4a of the straight advance guide barrel 4 engages with a straight movement pin 6a provided in the first-group lens barrel 6. The straight movement groove 4a restrains the first-group lens barrel 6 from moving in the rotational direction. Thus when the moving cam ring 3 pivots, the first-group lens barrel 6 moves in the direction along the optical axis.

Similarly, each of the fixed followers 37a and 37b provided in the second-group lens barrel 37 engages with a corresponding one of the cam grooves 3d and 3e provided in the moving cam ring 3 and engages with the straight movement groove 4b provided in the straight advance guide barrel 4. The movable cam-followers 8a and 8b of the second-group lens barrel 37 engage with respective ones of the cam grooves 3d and 3e and engage with the straight movement groove 4b. Since the straight movement groove 4b restricts the second-group lens barrel 37 to move only in the optical axis direction, when the moving cam ring 3 pivots, the second-group lens barrel 37 moves in the optical axis direction along the cam grooves 3d and 3e.

The cam groove 3d extends to and terminates at a location immediately short of the groove 3g that is provided on a front end portion of the moving cam ring 3. The cam groove 3e does not have a cam groove portion thereof extending beyond the rear end of the moving-ring cam 3. That is, the cam groove 3e includes the actual cam groove portion 3h (hereinafter sometimes referred to as "the cam groove 3e") that is formed on the moving cam ring 3 so as to extend to and terminate at the rear end of the moving cam ring 3 and a virtual cam groove portion 3i (hereinafter sometimes referred to as "the virtual cam groove") that hypothetically extends continuously from the actual cam groove portion 1b to a position outside the moving cam ring 3. The cam groove 3e including this virtual cam groove portion describes the same locus as the cam groove 3d does.

Now, let it be assumed that the system including the lens barrel is in a "power-off" state, and the lens barrel is in a retracted state. In this state, as shown in FIG. 2A, one of the movable cam-followers 8b is disengaged from the cam groove 3e, and the other movable cam-follower 8a is engaged with the cam groove 3d. However, the movable cam-follower 8b is positioned on that locus which is defined by the cam groove 3e and the virtual cam groove. This state of engagement is the same for the fixed followers 37a and 37b that are integrally provided in the second-group lens barrel 37. That is, the fixed follower 37a is engaged with the cam groove 3d, and the fixed follower 37b is disengaged from the cam groove 3e.

When the lens barrel is driven from the retracted state, the second-group lens barrel 37 is driven along the cam groove 3d. Specifically, when the power of the system is turned on when the lens barrel is in a retracted state, electric current flows through the zoom motor 25 and the gear 22 rotates in the clockwise (CW) direction. With the rotation of the gear 22, the moving cam ring 3 starts rotating via the gear teeth 3a meshing with the gear 22 in the counterclockwise (CCW) direction in FIG. 5, and in the left-hand direction in FIG. 2. When the initial position of the photographic optical system is reached, that is, when the position corresponding to a wide-angle position is reached, the zoom motor 25 is stopped and the moving cam ring 3 stops in a position that corresponds to the wide-angle position (FIG. 2B). At this state, the movable cam-follower 8b is still disengaged from the cam groove 3e. As shown in FIG. 4A, since the movable cam-follower 8b that is disengaged from the cam groove 3e is urged by the compression spring 9, the movable cam-follower 8b projects slightly further than the movable cam-follower 8a that is engaged with the cam groove 3d. However, since the movable cam-follower 8a is engaged with the cam groove 3d, a biasing force exerting in a direction away from the moving cam ring 3 acts upon the second-group lens barrel 37, whereby a state can be maintained in which the position of the optical axis of the second-group lens barrel 37 in relation to the moving cam ring 3 remains unchanged irrespective of any posture. As a result, a lens barrel that can guarantee optical performance can be realized.

Now, a description will be given of a case where the photographer operates a zoom button (not shown) to carry out a zooming operation of the photographic optical system from the wide-angle position to the telephoto position.

When the zoom button (not shown) is operated to carry out a zooming operation of the photographic optical system from the wide-angle position to the telephoto position, the gear 22 is rotatively driven by the zoom motor 25 in the clockwise direction (CW), and the moving cam ring 3 starts to rotate from a position corresponding to the wide-angle position in the counterclockwise direction (CCW). The moving cam ring 3 moves in the optical axis direction towards the object while pivoting, and the moving cam-follower 8b switches from the virtual cam groove to the cam groove 3e of the moving cam ring 3. Since the moving cam-follower 8b is being urged by the compression spring 9 before it engages with the cam groove 3e, the moving cam-follower 8b projects slightly further than the moving cam-follower 8a that is engaged with the cam groove 3d.

In the present embodiment, as shown in FIGS. 3A and 3B, a slope 3f is provided on the end portion of the cam grove 3e on the side close to the virtual cam groove, so that the cam-follower 8b which is in a projected state can smoothly switch to the cam groove 3e. Specifically, as shown in FIG. 3B, the slope 3f is provided that is tapered along an area several mm from the end edge of the cam groove 3e, so that the moving cam-follower 8b can smoothly engage with the cam groove 3e. The entry opening of the slope 3f is formed from a deeper position than the position to which the movable cam-follower 8b can project when disengaged from the cam groove 3e. By this construction, when the lens barrel is driven, the movable cam-follower 8b gradually engages with the slope 3f, and ultimately, the movable cam-follower 8b is smoothly introduced to the cam groove 3e without impact. That is, as shown in FIG. 4B, the movable cam-follower 8b will engage with the cam groove 3e, similarly to the movable cam-follower 8a that engages with the cam groove 3d. In this state where the two movable cam-followers 8a and 8b are engaged with the corresponding cam grooves 3d and 3e, a biasing force exerting in a direction away from the moving cam ring 3 acts also upon the second-group lens barrel 37, thereby making it possible to maintain a state wherein the optical axis of the second-group lens barrel 37 is unchanged irrespective of any posture.

The lens barrel is then driven to a telephoto position. Here, immediately before the telephoto position, the cam groove 3d terminates at a location short of the groove 3g. However, in the present embodiment, unlike the end portion of the cam groove 3e on the side close to the virtual cam groove, the terminal end portion of the cam groove 3d is not completely removed. Thus, there is no fear that the moving cam-follower 8a will become disengaged from the cam groove 3d, and therefore, there are no slopes provided near the boundary between the cam groove 3d and the groove 3g. However, in a different design, it may be configured such that a virtual cam is included and the cam groove 3d is completely removed at a position immediately before the telephoto position. In this case, it becomes necessary to provide a slope near the terminal end portion of the cam groove 3d.

In this manner, the photographic optical system reaches the telephoto position (FIG. 2C). In this case, because the moving cam-followers 8a and 8b are engaged with the cam grooves 3d and 3e, respectively, a biasing force exerting in a direction away from the moving cam ring 3 acts upon the second-group lens barrel 37, thereby making it possible to maintain a state wherein the optical axis of the second-group lens barrel 37 is unchanged irrespective of any posture.

Next, when the photographer operates the zoom button to carry out a zooming operation from the telephoto position to the wide-angle position, the zoom motor 25 is driven and the gear 22 rotates in the counterclockwise direction (CCW). With the rotation of the gear 22, the moving cam ring 3 starts to rotate in the clockwise (CW) direction in FIG. 6, and in the right-hand direction in FIG. 2. In this case, the two movable cam-followers 8a, 8b are engaged with the cam grooves 3d and 3e, respectively, but the movable cam-follower 8b that is engaged with the cam groove 3e will enter the virtual cam groove and thus will become disengaged from the cam groove 3e. However, before disengagement, due to the presence of the slope 3f that is provided in the cam groove 3e, the engagement of the movable cam-follower Bb with the cam groove 3e becomes completely released before the moving cam-follower 8b enters the virtual cam groove. With the further rotation of the moving cam ring 3 in the clockwise direction, the moving cam-follower 8b enters the virtual cam groove and thus can smoothly switch to the virtual cam groove from the cam groove 3e.

As described above, according to the present embodiment, it is possible to provide a lens barrel that can be reduced in size while maintaining high optical performance.

The present embodiment shows a case where the moving cam-follower 8b and the cam groove 3e are engaged with each other through the shooting zone, that is, from the wide-angle position to the telephoto position. However, it may be arranged such that the moving cam-follower 8b and the cam groove 3e are engaged outside the shooting zone. An example of such a zone outside the shooting zone is a retracted zone where the moving cam-follower 8b is disengaged from the cam groove 3e. The moving cam-follower 8b is brought into engagement with the cam groove 3e while moving to the wide-angle position. Since photographs are not taken in this retracted zone, there is no need to guarantee optical performance, and thus the second-group lens barrel 37 need not necessarily be biased by means of the moving cam-follower 8a. Therefore, for example, it is possible to replace the movable cam-follower 8a with the fixed follower 37a. In a zone where the optical performance must be guaranteed, the movable cam-follower 8b engages with the actual cam groove 3e, and by the action of the movable cam-follower 8b, the coaxial degree between the first-group lens barrel and the second-group lens barrel is maintained at a high precision. Thus it is possible to reduce the number of movable cam-followers to a single one.

Further, the present embodiment shows a case where the end portions of the movable cam-followers 8a and 8b are tapered. However, their shapes are not limited to this, and the front end portions of the movable cam-followers 8a and 8b may be formed into a spherical shape. Alternatively, as shown in FIG. 8, the front end portions of the movable cam-followers 8a and 8b may be arranged in a combined formation having a tapered section 80a and a spherical section 80b.

Figure 9A:
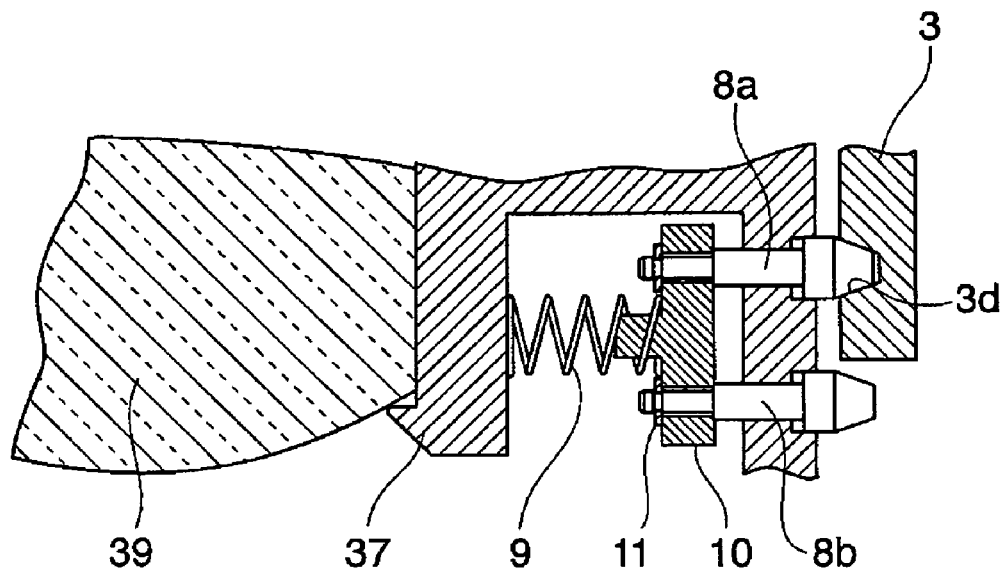
FIG. 9A is a view showing the configuration of the essential parts of a movable cam-follower of a lens barrel according to a second embodiment of the present invention.
Figure 9B:
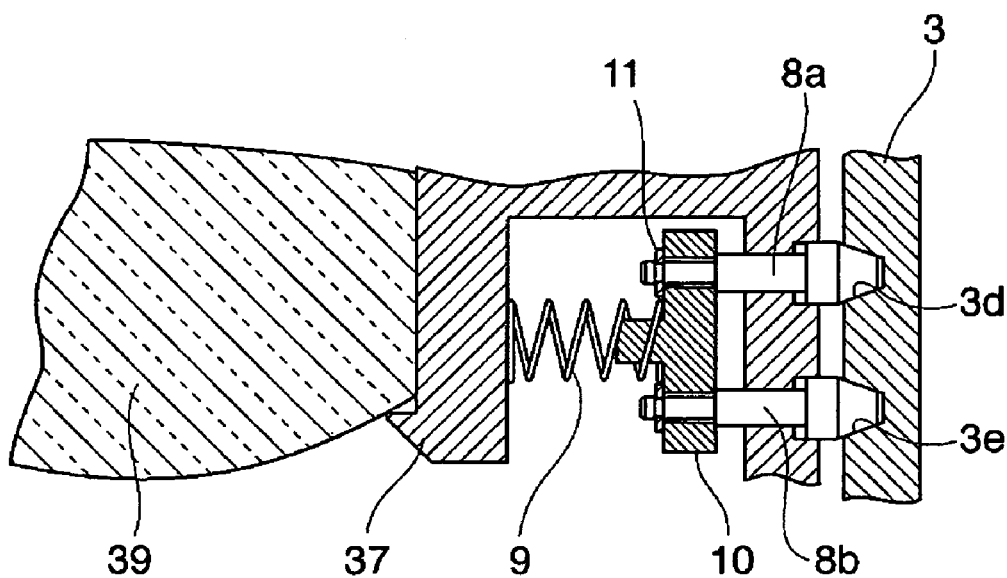
FIG. 9B is a view showing the configuration of the essential parts of another movable cam-follower of the lens barrel of the second embodiment of the present invention.
Figure 10:
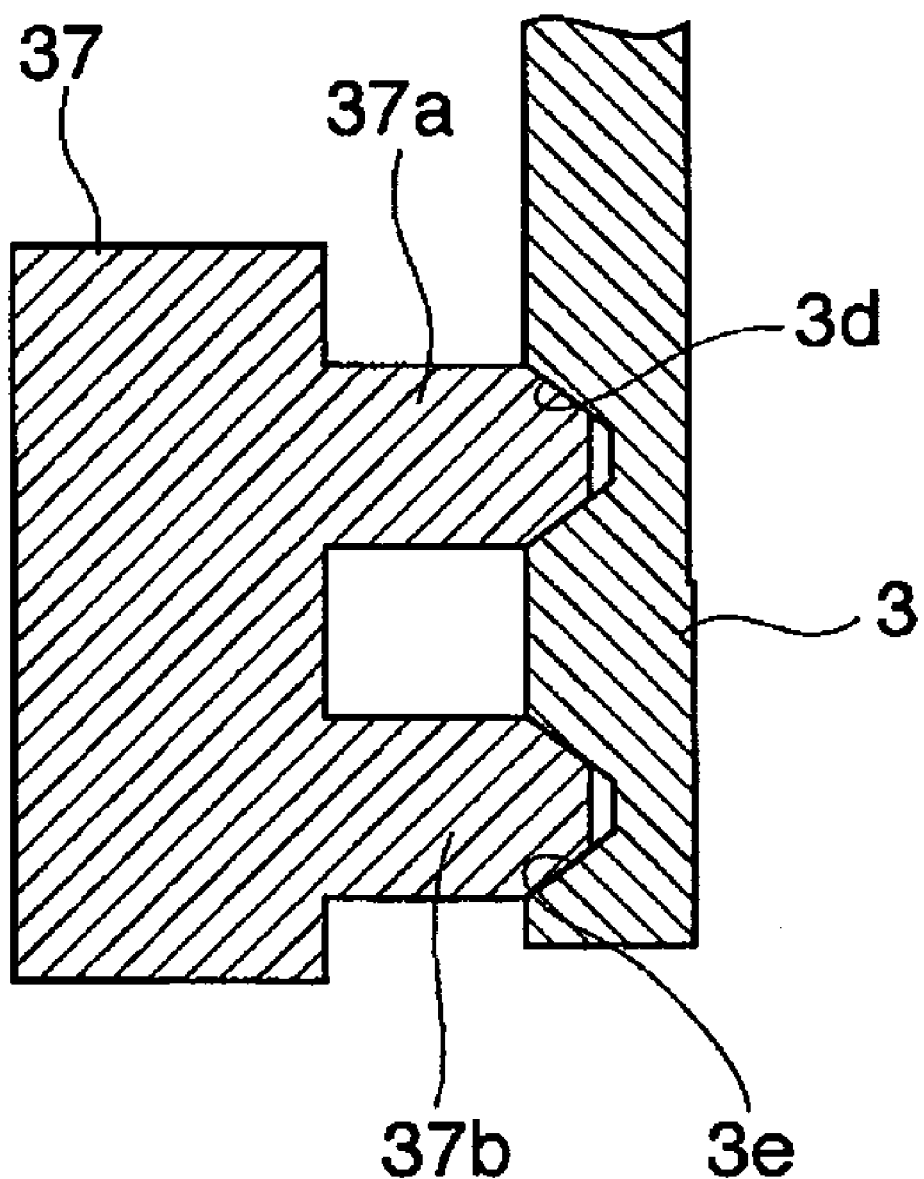
FIG. 10 is a cross-sectional view showing a state where a cam-follower of a second-group lens barrel engages with a cam groove of a moving cam ring in a conventional lens barrel.

Next, a second embodiment of the present invention will be described in detail with references to FIGS. 9A and 9B. FIG. 9A is a view showing the configuration of the essential parts of a movable cam-follower of a lens barrel according to a second embodiment of the present invention, and FIG. 9B is a view showing the configuration of the essential parts of another movable cam-follower of the lens barrel of the second embodiment of the present invention. In the second embodiment, elements having the same function as that of the first embodiment are designated by identical reference numerals, and duplicate description thereof and description of an operation are omitted.

As shown in FIGS. 9A and 9B, in the second embodiment, a coupling member 10 is provided to hold the two movable cam-followers 8a and 8b to an E ring 11. The coupling member 10 is urged by the compression spring 9 in a direction pointing from the second-group lens barrel 37 toward the moving cam ring 3 and orthogonal to the optical axis. Due to this structure, the two movable cam-followers 8a and 8b are urged toward and engaged with the cam grooves 3d and 3e of the moving cam ring 3 by the compression spring 9.

As shown in FIG. 9A, when the photographic optical system is in a position immediately before the wide-angle position, the movable cam-follower 8a engages with the cam groove 3d of the moving cam ring 3 and the moving cam-follower 8b is disengaged from the cam groove 3e of the moving cam ring 3. This state is the same as that of the first embodiment. However, the movable cam-followers 8a and 8b are held by the coupling member 10 such that the lengths by which the movable cam-followers 8a and 8b project from the second-group lens barrel 37 are maintained to be the same. Due to this structure, the movable cam-follower 8b that has become disengaged from the cam groove 3e does not project further than the movable cam-follower 8a as in the first embodiment, and the movable cam-follower 8b is held such that the length by which the movable cam-follower 8b projects is maintained to be the same as that of the movable cam-follower 8a that is engaged with the cam groove 3d.

As shown in FIG. 9B, when the photographic optical system moves from a position immediately before the wide-angle position to a position within the shooting zone by a zooming operation, since the two movable cam-followers 8a and 8b are held by the coupling member 10 such that the amounts of projection of the two movable cam-followers 8a and 8b from the second-group lens barrel 37 are kept to be the same, the movable cam-follower 8b that is disengaged from the cam groove 3e will smoothly be introduced into the cam groove 3e for engagement therewith. Here, in order to establish the engagement of the moving cam-follower 8b with the cam groove 3e more smoothly, a tapered slope 3f may be provided along an area several mm from the end edge of the cam groove 3e. It is preferable that the depth of the slope 3f is formed deeper than the maximum possible amount of projection of the movable cam-follower 8b.

In this manner, by holding the two movable cam-followers 8a and 8b by the coupling member 10, and by urging the coupling member 10 by the compression spring 9, it is possible to realize an aligning effect on the second-group lens barrel 37, thereby making it possible to maintain a state in which the optical axis does not change irrespective of any posture.

This application claims the benefit of Japanese Patent Application No. 2004-373421 filed Dec. 24, 2004, which is hereby incorporated by reference herein in its entirety.

What is claimed is:

1. A lens barrel comprising:
a cam ring (3) that is disposed for rotation about an optical axis;
a linked member (37) that can advance and recede in a direction of the optical axis with rotation of said cam ring about the optical axis;
first and second cam grooves (3d, 3e) formed in said cam ring for guiding advancement and receding of said linked member in the direction of the optical axis; and
first and second cam-followers (8a, 8b) that are provided in said linked member and are engageable with said first cam groove and said second cam groove, respectively,
wherein said second cam-follower is disengageable from its corresponding second cam groove,
a depth of said second cam groove in a position where said second cam-follower is introduced into said second cam groove is deeper than that of said second cam groove at a different position.

2. A lens barrel comprising:
a cam ring (3) that is disposed for rotation about an optical axis;
a linked member (37) that can advance and recede in a direction of the optical axis with rotation of said cam ring about the optical axis;
first and second cam grooves (3d, 3e) formed in said cam ring for guiding advancement and receding of said linked member in the direction of the optical axis;
first and second cam-followers (8a, 8b) that are provided in said linked member and are engageable with said first cam groove and said second cam groove, respectively; and
an urging member (9) that urges said first and second cam-followers,
wherein at least one of said first and second cam-followers is disengageable from its corresponding cam groove.

3. A lens barrel as claimed in claim 2, wherein a depth of said second cam groove in a position where said second cam-follower is introduced into said second cam groove is deeper than that of said second cam groove at a different position.

4. A lens barrel as claimed in claim 2, wherein a front end portion of at least one of said first and second cam-followers is tapered.

5. A lens barrel as claimed in claim 2, wherein a front end portion of at least one of said first and second cam-followers is spherical.

6. An optical device including a lens barrel as claimed in claim 1.

7. An optical device including a lens barrel as claimed in claim 2.

* * * * *

UNITED STATES PATENT AND TRADEMARK OFFICE
CERTIFICATE OF CORRECTION

| | | |
|---|---|---|
| PATENT NO. | : 7,113,350 B2 | Page 1 of 1 |
| APPLICATION NO. | : 11/313455 | |
| DATED | : September 26, 2006 | |
| INVENTOR(S) | : Toshiyuki Yasuda | |

It is certified that error appears in the above-identified patent and that said Letters Patent is hereby corrected as shown below:

Title Page

In Section (75) Inventor: the inventor's residence is misspelled and should appear as follows:

--Kawasaki-shi--

In Section (73) Assignee: the Assignee is incorrect and should be as follows:

--CANON KABUSHIKI KAISHA--

Signed and Sealed this

Twenty-sixth Day of February, 2008

JON W. DUDAS
*Director of the United States Patent and Trademark Office*